United States Patent
Chuang et al.

(10) Patent No.: US 9,902,317 B1
(45) Date of Patent: Feb. 27, 2018

(54) SYSTEM AND METHOD FOR CONTROLLING MOBILE WARNING TRIANGLE

(71) Applicant: HONGFUJIN PRECISION ELECTRONICS (TIANJIN) CO., LTD., Tianjin (CN)

(72) Inventors: Ya-Kuan Chuang, New Taipei (TW); Kai-Fan Lee, New Taipei (TW); Po-Cheng Chen, New Taipei (TW); Chi-Ming Huang, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 15/587,531

(22) Filed: May 5, 2017

(30) Foreign Application Priority Data

Apr. 12, 2017 (CN) .......................... 2017 1 0236671

(51) Int. Cl.
*B60Q 7/00* (2006.01)
*B60Q 1/52* (2006.01)

(52) U.S. Cl.
CPC ............ *B60Q 1/52* (2013.01); *B60Q 2400/40* (2013.01)

(58) Field of Classification Search
CPC .............................. B60Q 1/52; B60Q 2400/40
See application file for complete search history.

(56) References Cited

U.S. PATENT DOCUMENTS

| | | | |
|---|---|---|---|
| 6,276,080 B1 * | 8/2001 | Brennan ................ | B60Q 1/268 116/63 T |
| 8,742,917 B2 * | 6/2014 | Ho .......................... | B60Q 7/00 116/63 P |
| 2002/0154947 A1 * | 10/2002 | Farritor ................. | E01F 15/006 404/6 |
| 2003/0090392 A1 * | 5/2003 | Schuessler ........... | G08G 1/0965 340/988 |
| 2005/0046596 A1 * | 3/2005 | Nelson .................... | B60Q 1/52 340/908 |
| 2007/0189028 A1 * | 8/2007 | Chen ........................ | B60Q 7/00 362/545 |
| 2009/0009315 A1 * | 1/2009 | Liu .......................... | B60Q 1/52 340/471 |
| 2009/0308304 A1 * | 12/2009 | Ho .......................... | G09F 13/16 116/63 T |
| 2012/0262933 A1 * | 10/2012 | Larsson ................... | B60Q 1/30 362/496 |
| 2015/0073623 A1 * | 3/2015 | Zhang ..................... | G09F 13/16 701/2 |
| 2016/0152176 A1 * | 6/2016 | Kang ....................... | B60Q 1/46 340/473 |
| 2016/0202077 A1 * | 7/2016 | Huang ............... | G06K 9/00805 701/540 |

* cited by examiner

*Primary Examiner* — Joseph Feild
*Assistant Examiner* — Rufus Point
(74) *Attorney, Agent, or Firm* — ScienBiziP, P.C.

(57) ABSTRACT

A control system for a mobile warning triangle, to implement route planning by distance sensors and internet connection. Modules can control the mobile warning triangle to rotate to establish an environmental map and convert the environmental map into a linear vector map. A line forward can be established as a reference direction and the mobile warning triangle moved a second predetermined distance. A driving control module controls the mobile warning triangle to keep moving forward on the original line or to move on a reselected line. A control method of the mobile warning triangle is also provided.

15 Claims, 6 Drawing Sheets

SYSTEM AND METHOD FOR CONTROLLING MOBILE WARNING TRIANGLE

FIELD

The subject matter herein generally relates to road traffic safety.

BACKGROUND

A warning triangle raised at a distance for a broken-down car can warn other vehicles to slow down and change lanes. A current mobile warning triangle can implement route planning through GPS technology. However, it is difficult to implement route planning through the GPS technology if the network is unstable.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
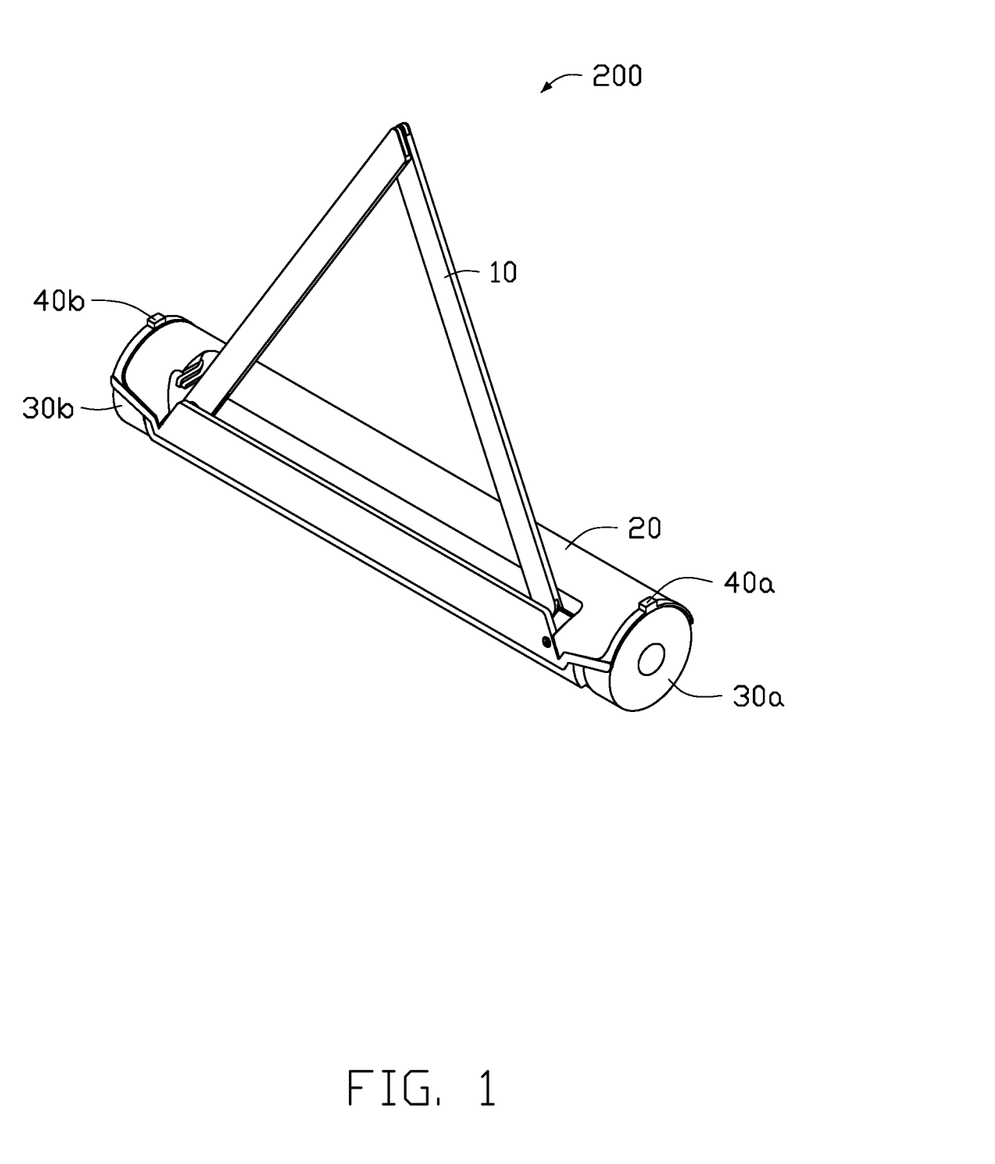
FIG. 1 is a diagram of an exemplary embodiment of a mobile warning triangle.

FIG. 1 illustrates a mobile warning triangle 200 in accordance with an exemplary embodiment.

The mobile warning triangle 200 comprises a warning triangle 10, a base 20, at least two wheels, one or more distance sensors, and a control system 100. The at least two wheels in this exemplary embodiment comprise two wheels 30a and 30b. The two wheels 30a and 30b are installed on two sides of the base 20. The one or more distance sensors in this exemplary embodiment comprise two distance sensors 40a and 40b. The two distance sensors 40a and 40b are installed on the base 20. The control system 100 drives the mobile warning triangle 200 to move.

Figure 2:
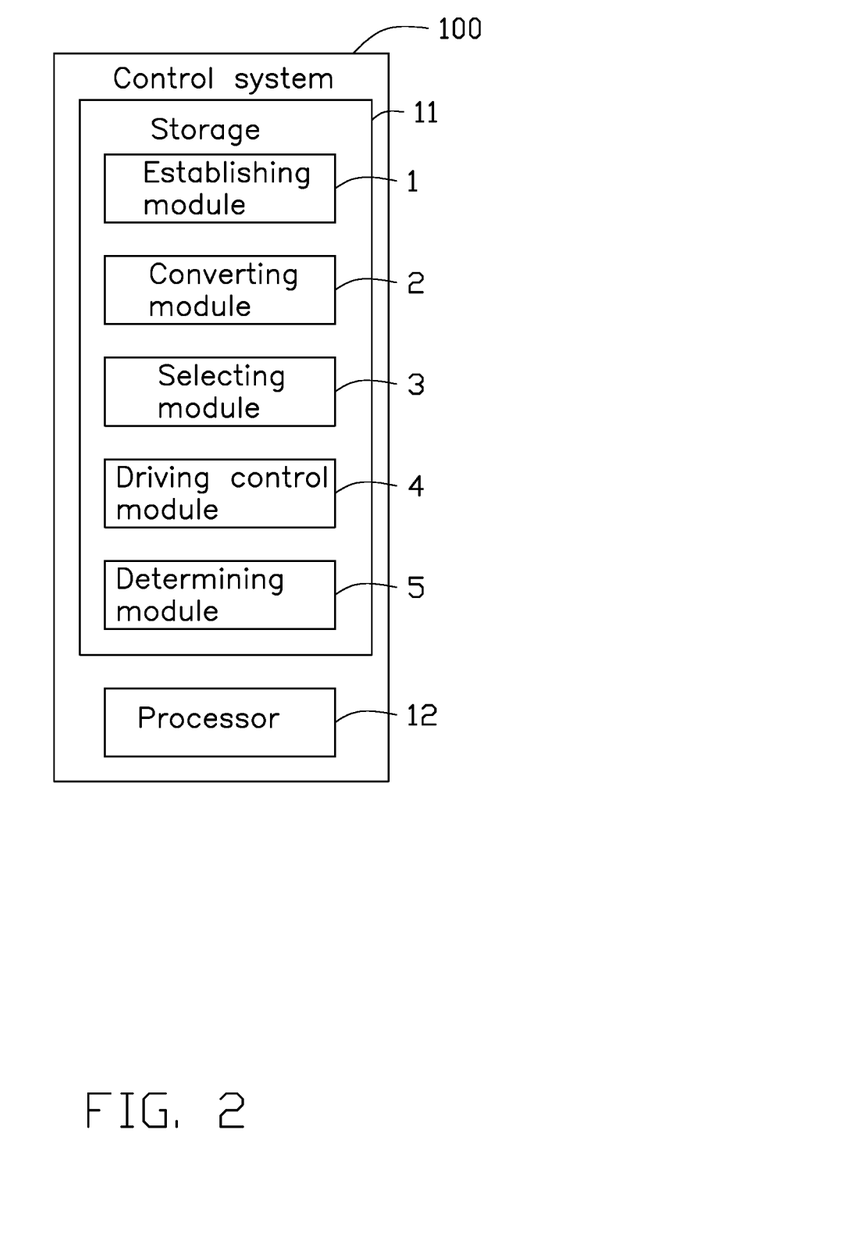
FIG. 2 is a block diagram of an exemplary embodiment of a control system of the mobile warning triangle.

Referring to FIG. 2, the control system 100 can comprise at least one storage 11 and at least one processor 12. The control system 100 can further comprises a plurality of modules, such as an establishing module 1, a converting module 2, a selecting module 3, a driving control module 4, and a determining module 5. The modules 1-5 can comprise one or more software programs in the form of computerized codes stored in the storage 1. The computerized codes can include instructions that can be executed by the processor 2 to provide functions for the modules 1-5.

Figure 3:
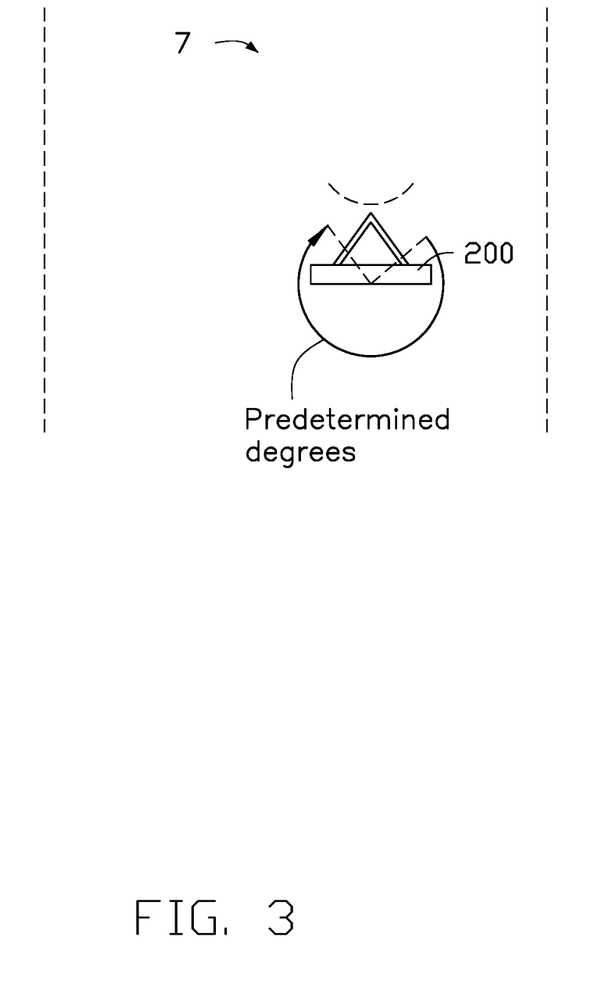
FIG. 3 is a diagram of an exemplary embodiment of an environmental map established by an establishing module in the control system of FIG. 2.

The establishing module 1 controls the mobile warning triangle 200 to rotate a predetermined degrees to establish an environmental map 7 (as shown in FIG. 3).

In one exemplary embodiment, the predetermined degrees can be 360 degrees. When the establishing module 1 controls the mobile warning triangle 200 to rotate 360 degrees, the distance sensors 40a and 40b obtains angle parameters and distance parameters between obstacles and the distance sensors 40a and 40b, and the establishing module 1 further establishes the environmental map 7 (as shown in FIG. 3) according to the angle parameters and the distance parameters.

Figure 4:
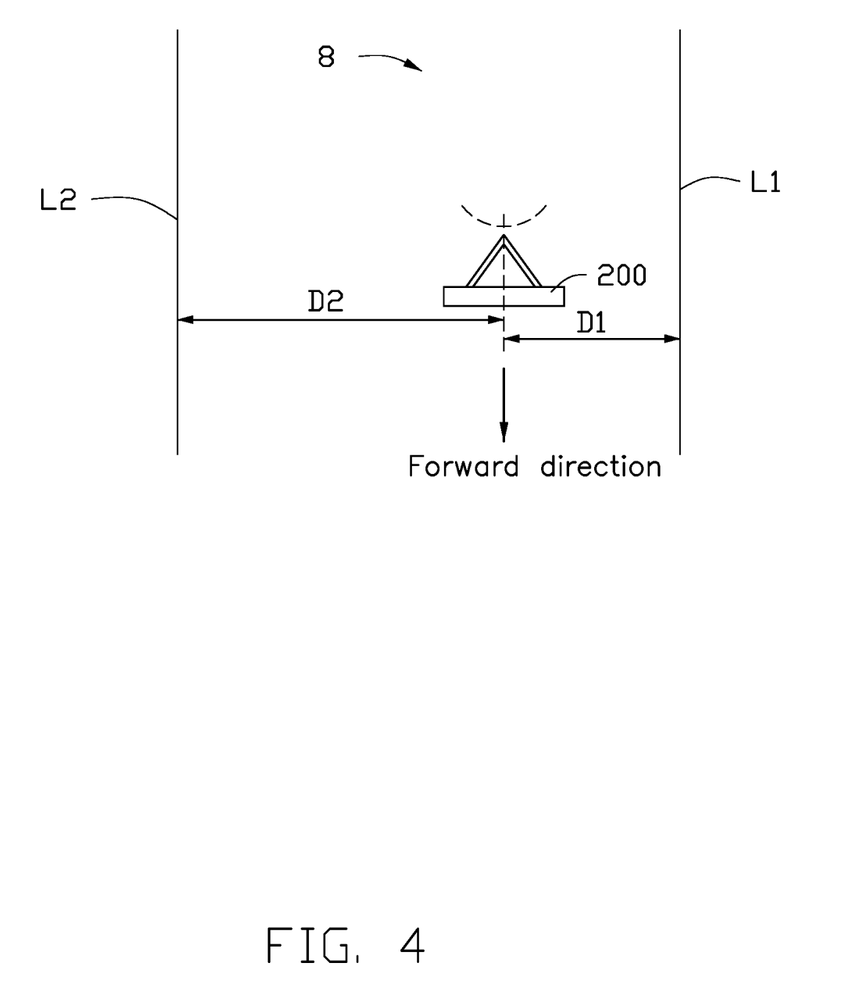
FIG. 4 is a diagram of an exemplary embodiment of a linear vector map converted from the environmental map of FIG. 3.
Figure 5:
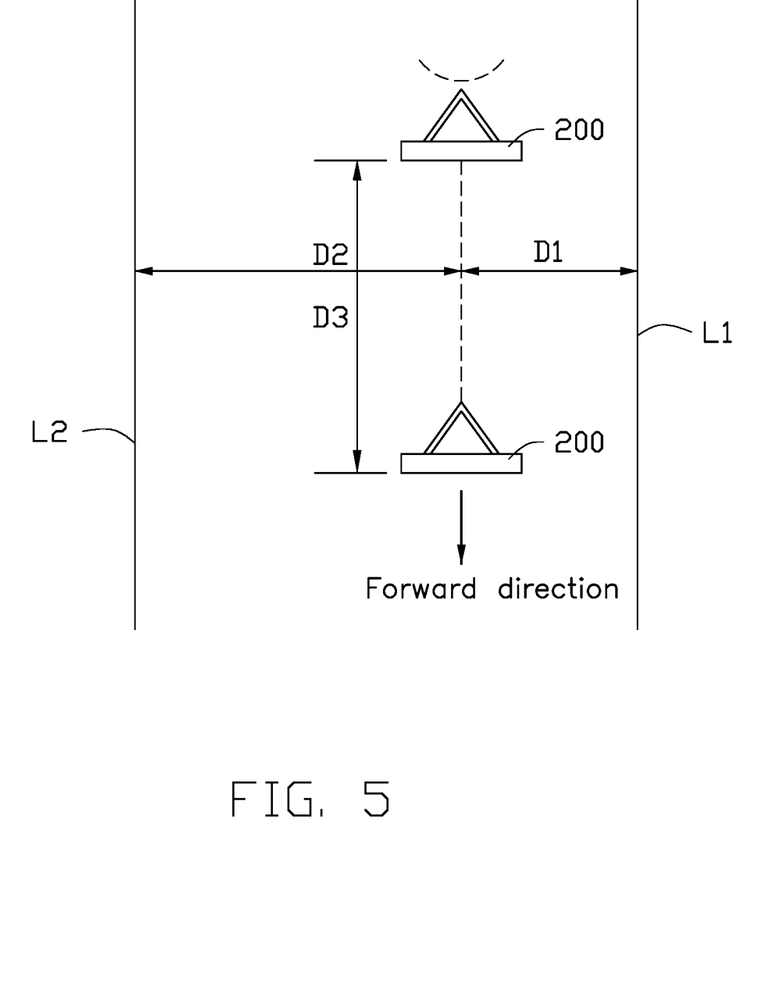
FIG. 5 is a diagram showing movements of an exemplary embodiment of the mobile warning triangle of the FIG. 1.

The converting module 2 converts the environmental map 7 into a linear vector map 8 (as shown in FIG. 4). The selecting module 3 selects a line (hereinafter "reliable line", as shown in FIG. 5) from the linear vector map 8 according to a forward direction of the mobile warning triangle 200. The driving control module 4 sets the reliable line as a reference direction and control the mobile warning triangle 200 to maintain a first predetermined distance D1 (as shown in FIG. 5) from the reliable line to move forward. The determining module 5 determines whether a moving distance of the mobile warning triangle 200 reaches a second predetermined distance D3 (as shown in FIG. 5).

When the moving distance reaches the second predetermined distance D3, the driving control module 4 controls the mobile warning triangle 200 to stop. Until the moving distance reaches the second predetermined distance D3, the establishing module 1 can update the environmental map 7, and the selecting module 3 can reselect the reliable line or change to another reliable line (varied reliable line). In this case, the driving control module 4 can set the reselected or varied reliable line as the reference direction and control the mobile warning triangle 200 to move along the first predetermined distance D1 from the reselected or varied reliable line.

For example, a car may break down in a curving tunnels and the mobile warning triangle 200 is raised at a distance from the car. The establishing module 1 establish a map of the tunnel. The driving control module 4 controls the mobile warning triangle 200 to move forward according to the real-time updating of the reliable line, to prevent the mobile warning triangle 200 from deviating from the car's lane and from colliding with the walls of the tunnel.

In one exemplary embodiment, the first predetermined distance D1 can be 3 meters for example. A value of the first predetermined distance D1 is determined by the reliable line and the car's lane. The second predetermined distance D3 can be 100 meters or 150 meters for example.

In one exemplary embodiment, the mobile warning triangle 200 comprises a first operation mode and a second operation mode. When the mobile warning triangle 200 operates in the first operation mode, the mobile warning triangle 200 implements a route planning operation through connections to the internet. For example, the mobile warning triangle 200 can connect to the internet to use the GPS technology to implement the route planning operation. The mobile warning triangle 200 also can connect to the internet to receive the route planning operation from a cloud server.

If the internet network is unstable, the mobile warning triangle 200 can switch into the second operation mode. When the mobile warning triangle 200 operates in the second operation mode, the mobile warning triangle 200 enables the distance sensors 40a and 40b, and the establishing module 1 controls the mobile warning triangle 200 to rotate the predetermined degrees to establish the environmental map 7. When the mobile warning triangle 200 operates in the first operation mode, the distance sensors 40a and 40b can work in a standby state.

In one exemplary embodiment, the distance sensors 40a and 40b can be ultrasonic sensors.

In one exemplary embodiment, the linear vector map 8 can comprise two outermost lines being parallel with the forward direction of the mobile warning triangle 200. The selecting module 3 selects a first outermost line, which has a shorter distance from the mobile warning triangle 200, as the reliable line.

Referring to FIG. 3, the establishing module 1 controls the mobile warning triangle 200 to rotate the predetermined degrees to establish the environmental map 7. The environmental map 7 is as shown as FIG. 3.

Referring to FIG. 4, the converting module 2 converts the environmental map 7 into the linear vector map 8. The linear vector map 8 is as shown as FIG. 4. The linear vector map 8 comprises a first line L1 and a second line L2. The first line L1 and the second line L2 are parallel with the forward direction of the mobile warning triangle 200. A first distance D1 between the first line L1 and the mobile warning triangle 200 is less than a second distance D2 between the second line L2 and the mobile warning triangle 200. The selecting module selects the first line L1 as the reliable line.

Referring to FIG. 5, the driving control module 4 sets the first line L1 as the reference direction and controls the mobile warning triangle 200 to maintain the first predetermined distance D1 from the first line L1 to move forward.

Figure 6:
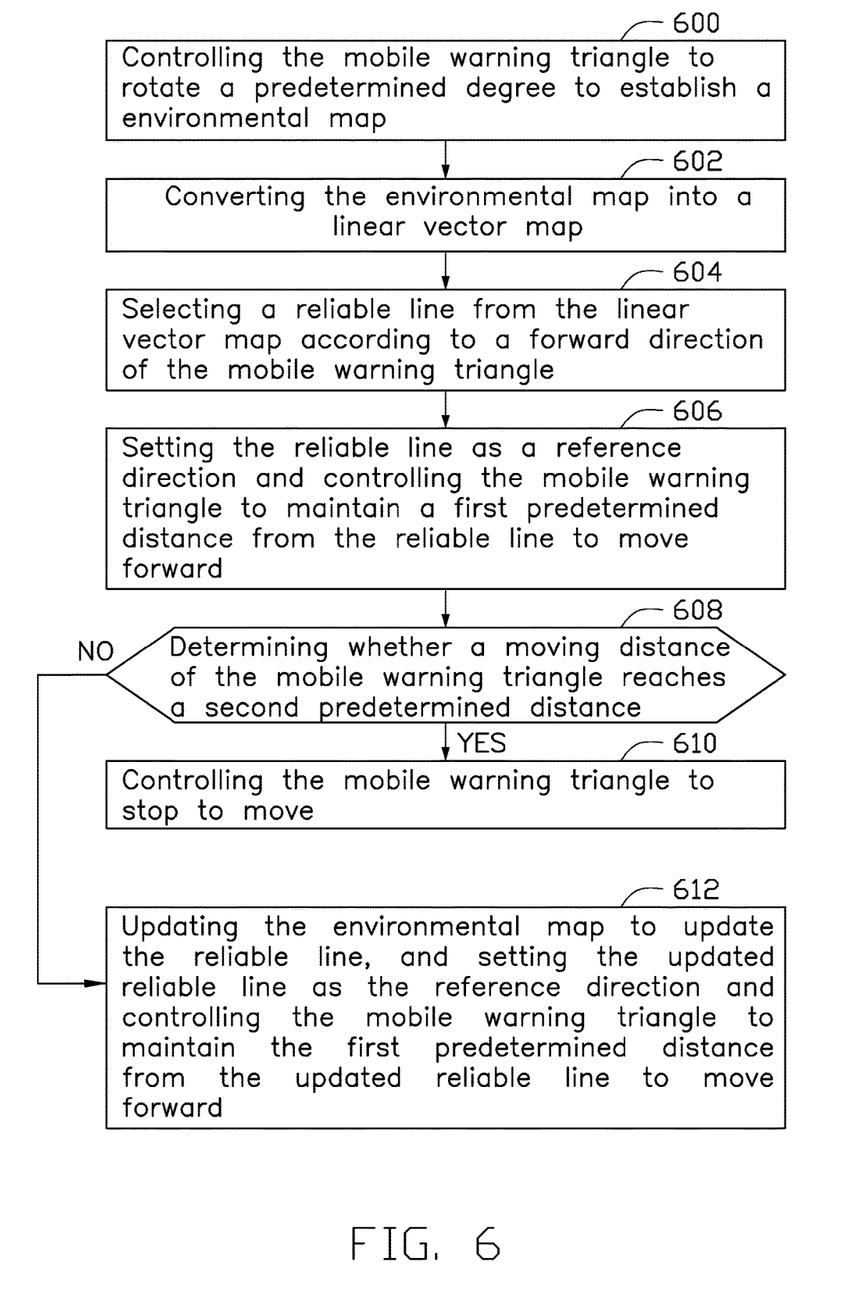
FIG. 6 is a flow diagram of an exemplary embodiment of a control method of the mobile warning triangle.

FIG. 6 illustrates one exemplary embodiment of an control method of the mobile warning triangle 200. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each step shown in FIG. 6 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 600.

In step 600, the establishing module 1 controls the mobile warning triangle 200 to rotate a predetermined degrees to establish an environmental map 7.

In step 602, the converting module 2 converts the environmental map 7 into a linear vector map 8.

In step 604, the selecting module 3 selects a reliable line from the linear vector map 8 according to a forward direction of the mobile warning triangle 200.

In step 606, the driving control module 4 sets the reliable line as a reference direction and control the mobile warning triangle 200 to maintain the first predetermined distance D1 from the reliable line to move forward.

In step 608, the determining module 5 determines whether a moving distance of the mobile warning triangle 200 reaches the second predetermined distance D3.

In step 610, when the moving distance reaches the second predetermined distance D3, the driving control module 4 controls the mobile warning triangle 200 to stop.

In step 612, when the moving distance does not reach the second predetermined distance D3, the establishing module 1 updates the environmental map 7, the selecting module 3 reselects or varies the reliable line, and the driving control module 4 sets the reselected or varied reliable line as the reference direction and controls the mobile warning triangle 200 to maintain the first predetermined distance D1 from the reselected reliable line to move forward.

In one exemplary embodiment, the mobile warning triangle 200 comprises a first operation mode and a second operation mode. When the mobile warning triangle 200 operates in the first operation mode, the mobile warning triangle 200 implements a route planning operation through connections to the internet. For example, the mobile warning triangle 200 can connect to the internet using GPS technology to implement the route planning operation. When the mobile warning triangle 200 operates in the second operation mode, the mobile warning triangle 200 enables the distance sensors 40a and 40b, the establishing module 1 controls the mobile warning triangle 200 to rotate the predetermined degrees to establish the environmental map 7. When the mobile warning triangle 200 operates in the first operation mode, the distance sensors 40a and 40b can work in a standby state.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A control method of a mobile warning triangle, the mobile warning triangle comprising: at least one storage configured to store a plurality of modules, the plurality of modules being a collection of instructions of an application operable in the mobile warning triangle; and at least one processor configured to execute the plurality of modules, the modules comprising an establishing module, a converting module, a selecting module, a driving control module, and a determining module; the control method comprising:

controlling the mobile warning triangle to rotate a predetermined degrees by the establishing module to establish an environmental map;
converting the environmental map into a linear vector map by the converting module;
selecting a line from the linear vector map according to a forward direction of the mobile warning triangle by the selecting module;
setting the line as a reference direction and controlling the mobile warning triangle to maintain a first predetermined distance from the line to move forward by the driving control module;
determining whether a moving distance of the mobile warning triangle reaches a second predetermined distance by the determining module;
controlling the mobile warning triangle to stop by the driving control module in response to the moving distance reaching the second predetermined distance; and
updating the environmental map by the establishing module, reselecting the line by the selecting module, setting the reselected line as the reference direction and controlling the mobile warning triangle to maintain the first predetermined distance from the reselect line to move forward by the driving control module in response to the moving distance not reaching the second predetermined distance.

2. The control method of claim 1, wherein the mobile warning triangle comprises a first operation mode and a second operation mode; when the mobile warning triangle operates in the first operation mode, the mobile warning triangle implements a route planning operation through connections to the internet; and when the mobile warning triangle operates in the second operation mode, the mobile warning triangle implements route planning through one or more distance sensors.

3. The control method of claim 2, wherein the one or more distance sensors are ultrasonic sensors, and the distance sensors obtain angle parameters and distance parameters between obstacles and the distance sensors.

4. The control method of claim 2, wherein the step of controlling the mobile warning triangle to rotate the predetermined degrees by the establishing module to establish the environmental map comprises:
controlling the mobile warning triangle to operate in the second operation mode and enabling the one or more distance sensors; and
controlling the mobile warning triangle to rotate the predetermined degrees by the establishing module to establish the environmental map.

5. The control method of claim 1, wherein the linear vector map comprises two outermost lines being parallel to the forward direction of the mobile warning triangle; and the line is one of the two outermost lines having a shorter distance from the mobile warning triangle.

6. A control system of a mobile warning triangle comprising:
at least one storage configured to store a plurality of modules, the plurality of modules being a collection of instructions of an application operable in the system;
at least one processor configured to execute the plurality of modules, the modules comprising:
an establishing module controlling the mobile warning triangle to rotate a predetermined degrees to establish an environmental map;
a converting module converting the environmental map into a linear vector map;
a selecting module selecting a line from the linear vector map according to a forward direction of the mobile warning triangle;
a driving control module setting the line as a reference direction and controlling the mobile warning triangle to maintain a first predetermined distance from the line to move forward; and
a determining module determining whether a moving distance of the mobile warning triangle reaches a second predetermined distance;
wherein when the moving distance of the mobile warning triangle reaches the second predetermined distance, the driving control module controls the mobile warning triangle to stop; and
when the moving distance of the mobile warning triangle does not reach the second predetermined distance, the establishing module updates the environmental map, the selecting module reselects the line, the driving control module sets the reselected line as the reference direction and controls the mobile warning triangle to maintain the first predetermined distance from the reselected line to move forward.

7. The control system of claim 6, wherein the mobile warning triangle comprises a first operation mode and a second operation mode; when the mobile warning triangle operates in the first operation mode, the mobile warning triangle implements a route planning operation through connections to the internet; and when the mobile warning triangle operates in the second operation mode, the mobile warning triangle implements route planning through one or more distance sensors.

8. The control system of claim 7, wherein the one or more distance sensors are ultrasonic sensors, and the distance sensors obtain angle parameters and distance parameters between obstacles and the distance sensors.

9. The control system of claim 7, wherein when the mobile warning triangle operates in the second operation mode and enables the one or more distance sensors, the establishing module controls the mobile warning triangle to rotate the predetermined degrees to establish the environmental map.

10. The control system of claim 6, wherein the linear vector map comprises two outermost lines being parallel to the forward direction of the mobile warning triangle; and the selecting module selects one of the two outermost lines having a less distance from the mobile warning triangle as the line.

11. A mobile warning triangle comprising:
a warning triangle;
a base;
at least two wheels installing on two sides of the base; and
a control system comprising:
at least one storage configured to store a plurality of modules, the plurality of modules being a collection of instructions of an application operable in the system;
at least one processor configured to execute the plurality of modules, the modules comprising:
an establishing module controlling the mobile warning triangle to rotate a predetermined degrees to establish an environmental map;
a converting module converting the environmental map into a linear vector map;
a selecting module selecting a line from the linear vector map according to a forward direction of the mobile warning triangle;

a driving control module setting the line as a reference direction and controlling the mobile warning triangle to maintain a first predetermined distance from the line to move forward; and a determining module determining whether a moving distance of the mobile warning triangle reaches a second predetermined distance;

wherein when the moving distance of the mobile warning triangle reaches the second predetermined distance, the driving control module controls the mobile warning triangle to stop; and when the moving distance of the mobile warning triangle does not reach the second predetermined distance, the establishing module updates the environmental map, the selecting module reselects the line, and the driving control module sets the reselected line as the reference direction and controls the mobile warning triangle to maintain the first predetermined distance from the reselected line to move forward.

12. The mobile warning triangle of claim 11, wherein the mobile warning triangle comprises a first operation mode and a second operation mode; when the mobile warning triangle operates in the first operation mode, the mobile warning triangle implements a route planning operation through connections to the internet; and when the mobile warning triangle operates in the second operation mode, the mobile warning triangle implements route planning through one or more distance sensors.

13. The mobile warning triangle of claim 12, wherein the one or more distance sensors are ultrasonic sensors, and the distance sensors obtain angle parameters and distance parameters between obstacles and the distance sensors.

14. The mobile warning triangle of claim 12, wherein when the mobile warning triangle operates in the second operation mode and enables the one or more distance sensors, the establishing module controls the mobile warning triangle to rotate the predetermined degrees to establish the environmental map.

15. The mobile warning triangle of claim 11, wherein the linear vector map comprises two outermost lines being parallel to the forward direction of the mobile warning triangle; and the selecting module selects one of the two outermost lines having a less distance from the mobile warning triangle as the line.

* * * * *